Nov. 3, 1964    R. L. HAYDEN ETAL    3,154,980
WIRE STRIPPING APPARATUS
Filed Feb. 14, 1963    4 Sheets-Sheet 1

INVENTORS
R.L.HAYDEN
E.G.LANGLOIS
D.C.STARKWEATHER
BY  J.R.Bergum
ATTORNEY

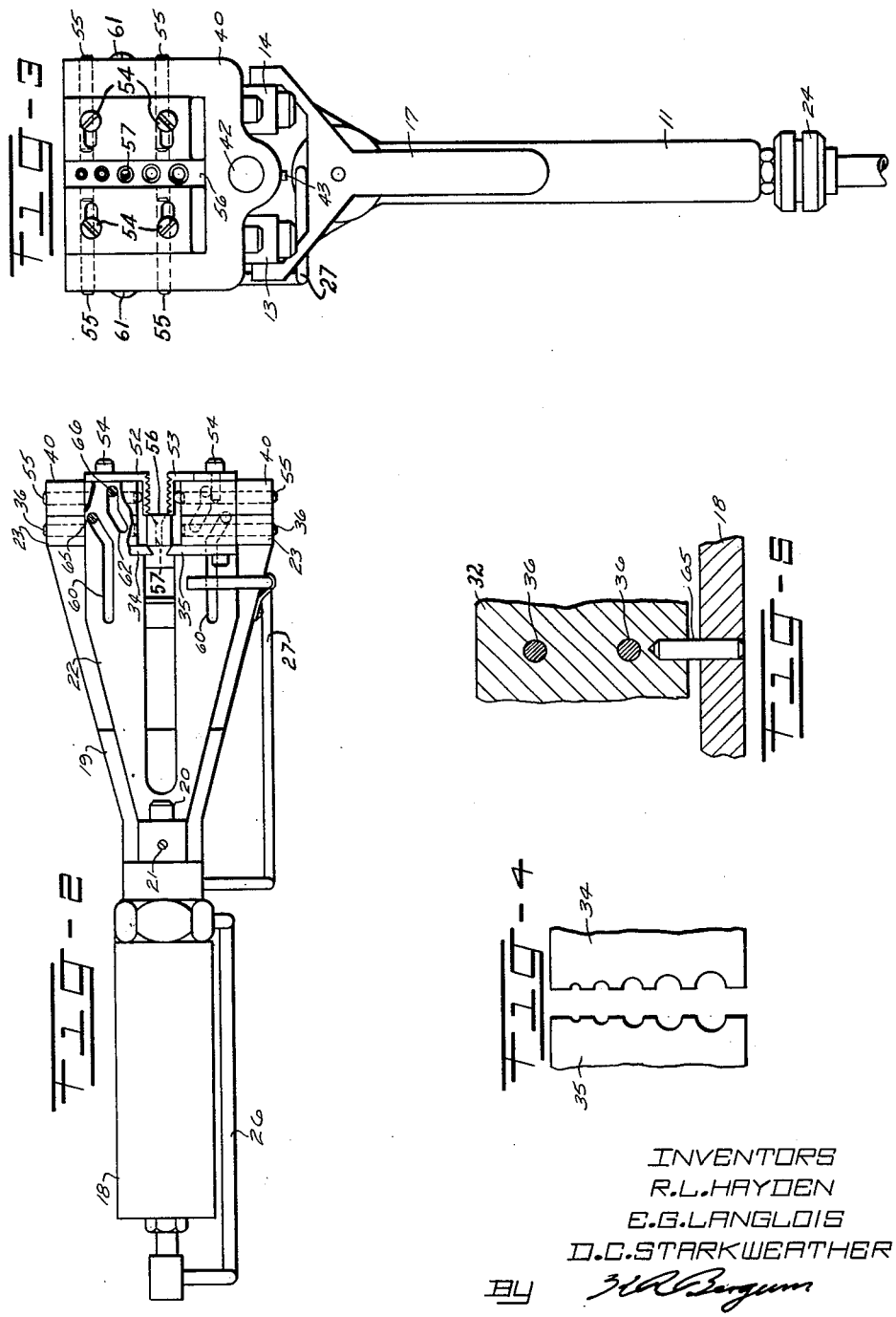

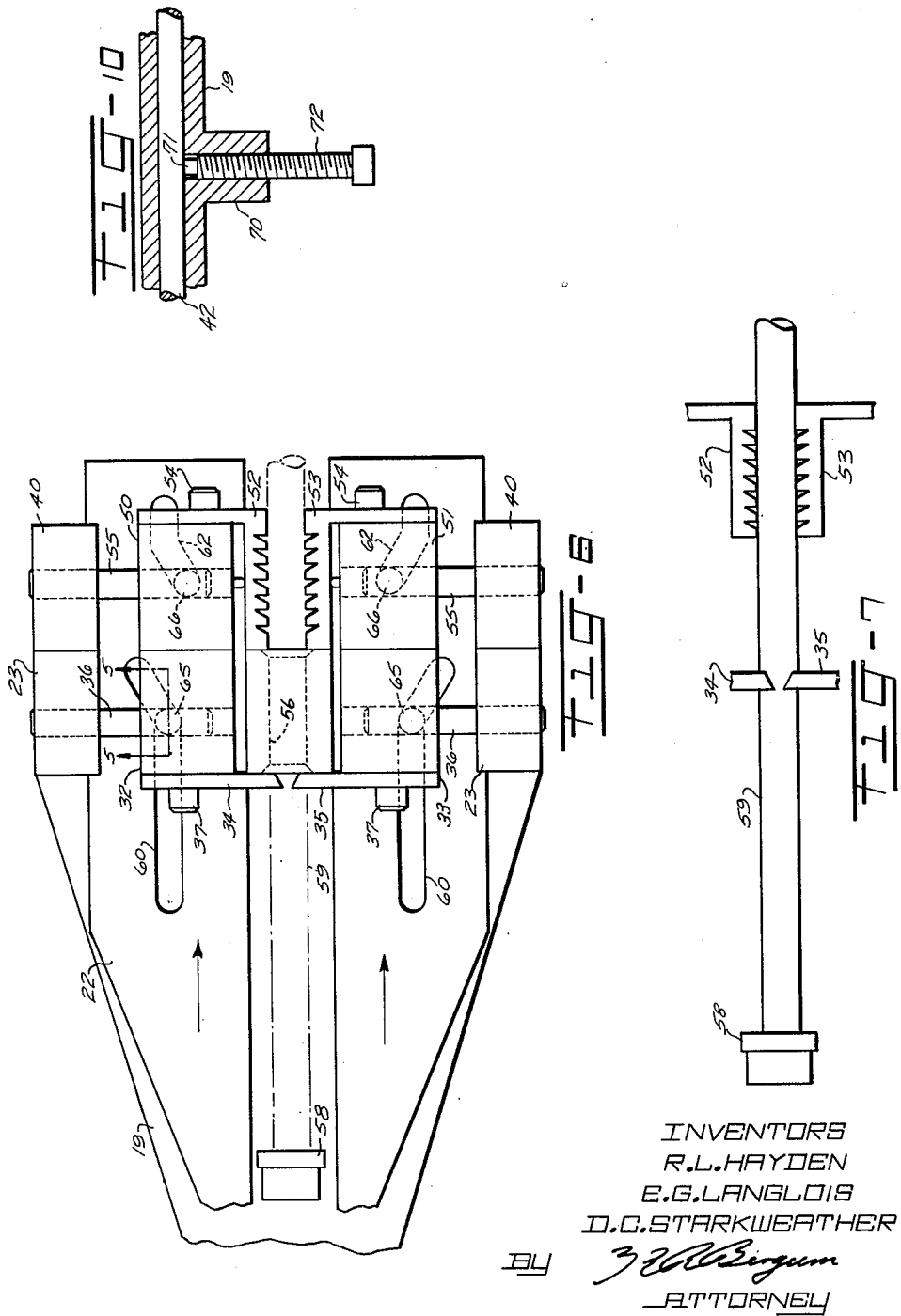

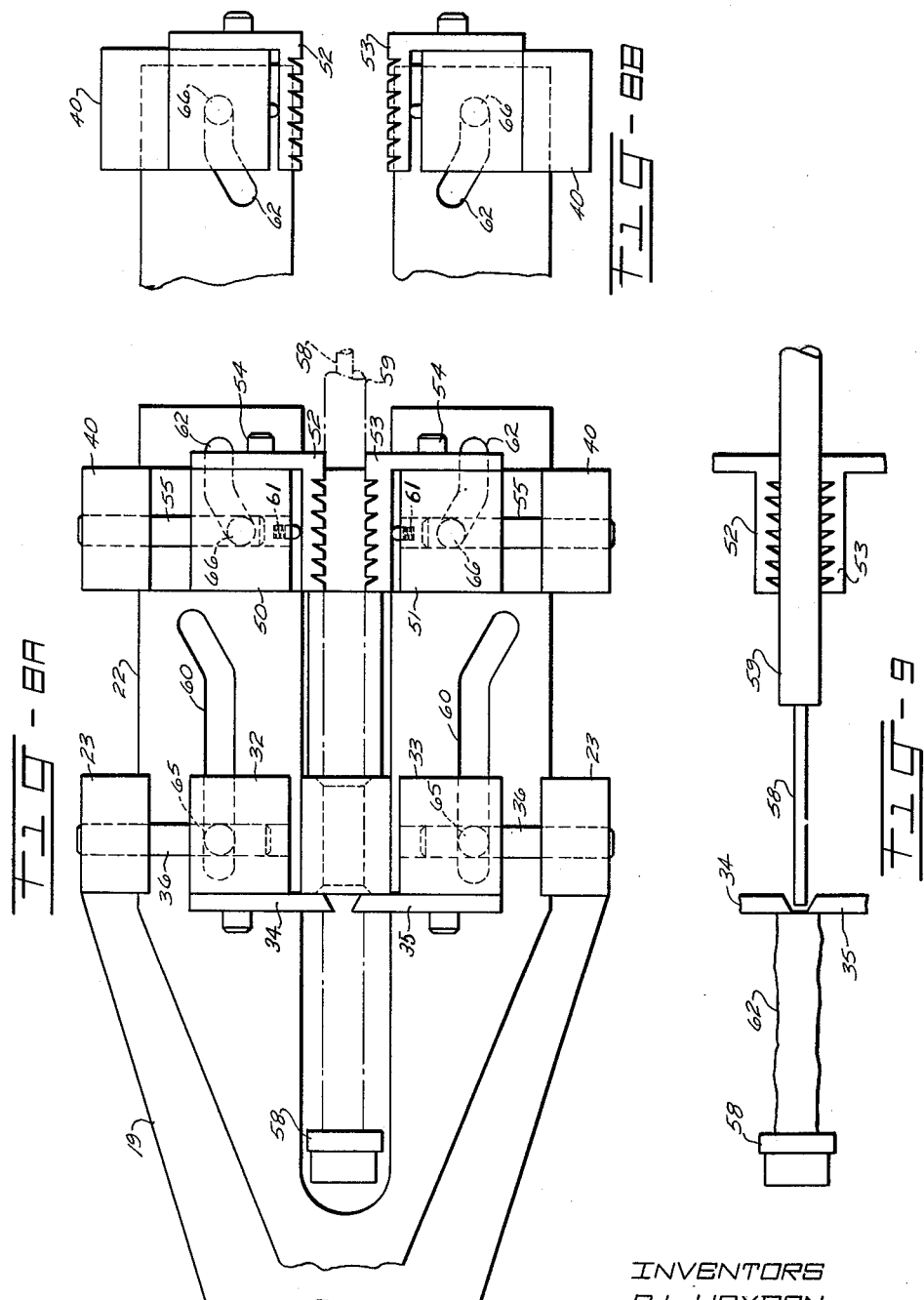

United States Patent Office 3,154,980
Patented Nov. 3, 1964

3,154,980
WIRE STRIPPING APPARATUS
Robert L. Hayden, Wakefield, Mass., Emile G. Langlois, Atkinson, N.H., and David C. Starkweather, Andover, Mass., assignors to Western Electric Company Incorporated, New York, N.Y., a corporation of New York
Filed Feb. 14, 1963, Ser. No. 258,432
19 Claims. (Cl. 81—9.51)

This invention relates to wire stripping apparatus and, more particularly, to a semi-automatic, trigger-actuated, wire stripping gun.

In the manufacture of complex electronic equipment, such as used in telephone exchanges, huge bays or arrays of cable are often employed. The cable in such bays generally comprises wires not only of various gauges, but also of solid and stranded construction.

Because of the size and weight of such cable, and because of the number of wire ends thereof of various lengths to be stripped, it is not surprising that conventional bench-mounted wire stripping devices have proven impractical.

The difficulty involved in handling the cable coupled with the necessity of using high production techniques during the stripping operation therefore dictated that the cable remain in a fixed position and that portable, handheld wire stripping devices be used to strip the insulation from the wires.

Prior commercially available hand-operated wire strippers may be basically classified into two main categories: (1) mechanical cutting devices, or (2) electrical burning devices.

With respect to the mechanical cutting devices, they may be subdivided into two main types, one requiring two operator motions, namely, plier-type hand clamping to cut the insulation coupled with hand pulling to strip the insulation from the wire, and the other requiring only hand clamping for both the cutting and stripping operations.

The aforementioned types of prior art mechanical wire strippers have been found selectively to produce or result in the following disadvantages: operator fatigue, nicking of the wire, or insulation flagging.

Prior commercially available burning devices generally work on the principle of heating two resistance wires to a high temperature and then bringing them, or electrodes associated therewith, together to scar the insulation of a wire interposed therebetween and thereby to allow the insulation to be removed. This method of insulation stripping requires both a clamping and a pulling motion by the operator.

These prior burning devices unfortunately selectively present or involve the following disadvantages: poor durability, high maintenance costs, danger to the operator caused by exposure to heated electrodes, and undesirable fumes from burned insulation.

Accordingly, it is an object of this invention to provide a wire stripper of unique and improved construction.

It is another object of this invention to improve the versatility and ease of manipulating a wire stripper.

It is a more specific object of this invention to provide a portable, lightweight, semi-automatic wire stripper applicable for use in equipment areas where wire of various gauges, core constructions and strip lengths are involved.

These and other objects of this invention are attained in one illustrative embodiment wherein the wire stripper is pistol-shaped, and includes a trigger-responsive cam assembly for actuating two opposed cutting heads and two opposed wire jaws in a unique sequence. The cutting heads are interposed between a positioning guide and the jaws, and each has a series of semi-circular cutting edges of predetermined sizes.

In accordance with an aspect of the invention, the cutting heads are movable bilaterally toward and away from each other and the jaws are sequentially movable orthogonally, i.e., successively in perpendicular directions, in response to the movable cam assembly connected to a driving piston.

In accordance with another aspect of the invention, the driving piston is air operated in response to actuation of a three-way valve controlled by the trigger. The use of a pneumatically operated piston rather than an electrically operated one results in the following advantages: (1) greater force in a given compact area, (2) smoother operation, and (3) simpler and more reliable linear motion of the driving mechanism.

In operation, the following sequences occur after the air-controlled trigger is actuated: the cam assembly advances with the piston; the cutting heads close, severing the insulation to the depth of the wire; and the jaws initially close to grasp the wire and then pull the wire away from the severed insulation. As the wire recedes, the cutting heads retain the severed portion of insulation, thus stripping the wire to a predetermined length. When the trigger is released, the piston and cam assembly are spring-returned to their original position. Immediately after the start of the piston's return travel, the jaws are opened. The cutting heads are not returned to their normal, open position until the piston is almost completely retracted. Also, upon release of the trigger, the air cylinder exhausts through the three-way valve and a tube to the cutting head area to blow the severed insulation away from the device.

The wire stripper embodied herein thus provides positive and reliable stripping action, is durable, is versatile with respect to accommodating both various wire sizes and lengths of stripped insulation, and requires a minimum of operator dexterity.

These and other objects and advantages of the invention will become more fully understood from a consideration of the following description and related accompanying drawings, in which:

FIG. 2 is a plan view, partially in section, of the device depicted in FIG. 1;

FIG. 3 is an end view of the device depicted in FIG. 1;

FIGS. 4 and 5 depict in detail certain fixtures associated with the cutting mechanism in the device of FIG. 1;

FIG. 6 is a partial, detail plan view of the cam assembly employed in the device of FIG. 1 prior to the insulation of a wire being stripped;

FIG. 7 is a partial, pictorial representation of the position of certain fixtures of the device of FIG. 1 relative to a wire to be stripped;

FIGS. 8A and 8B are partial, detail plan views of the cam assembly employed in the device of FIG. 1 after the insulation of a wire therein has been stripped;

FIG. 9 is a pictorial representation of the position of certain fixtures of the device of FIG. 1 after the insulation has been stripped from a wire inserted therein, and FIG. 10 is a partial detail view in section of an alternative biasing mechanism for use with the embodiment depicted in FIG. 1.

Figure 1:
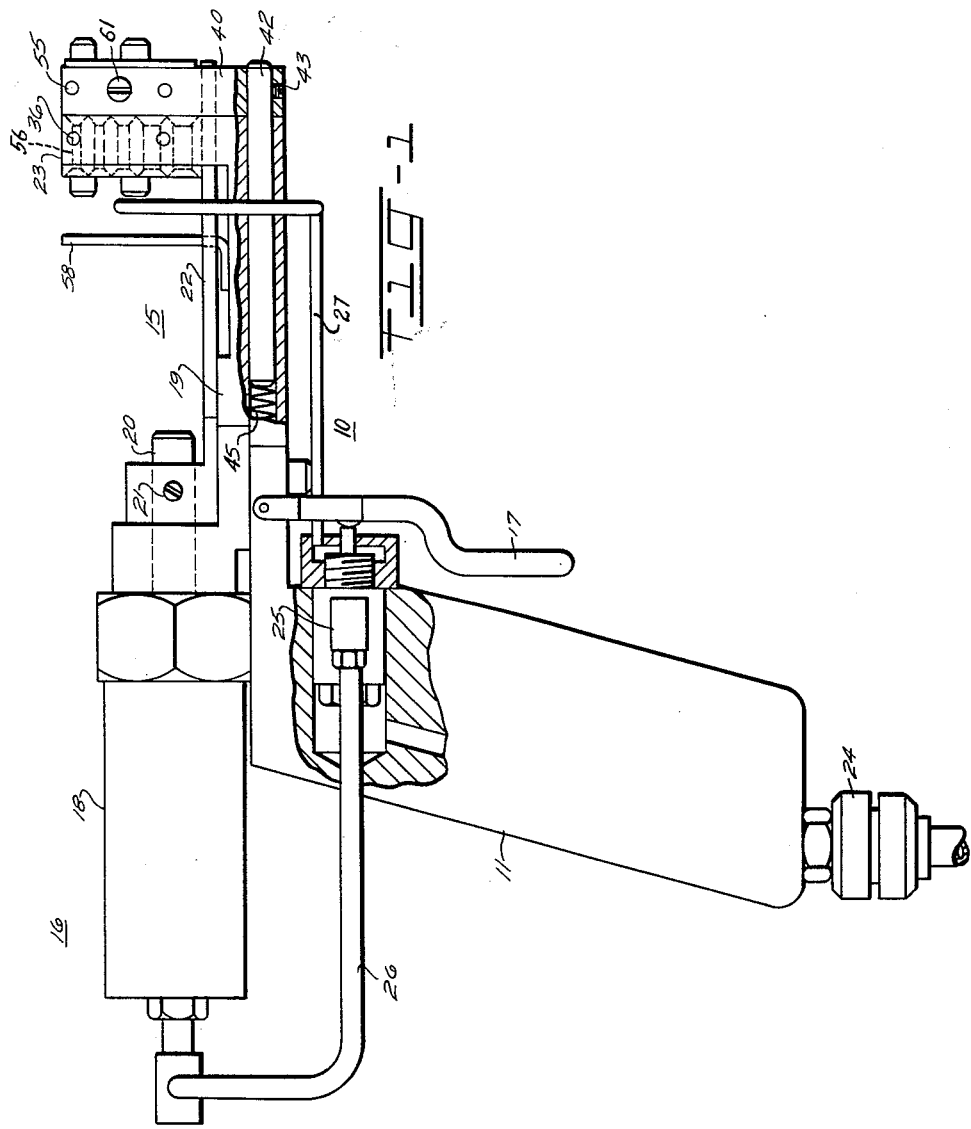
FIG. 1 depicts, partially in cross-section, one illustrative embodiment of the invention.

Referring now to the drawings and, more particularly, to FIGS. 1 through 3, a unique, semi-automatic wire stripping gun 10 is shown, which comprises a pistol-shaped, hand-grip member 11, preferably of metal, having two spaced, longitudinally extending base members 13, 14, best seen in FIG. 3. Base members 13, 14 support a cam-operated wire stripping mechanism shown generally in FIG. 1 by reference numeral 15, and a driving mechanism shown generally by reference numeral 16.

In accordance with an aspect of the invention, the driving mechanism 16 comprises a single-acting, spring returned air cylinder 18, pneumatically driving a piston 20 suitably connected to a vertically extending portion of a cam plate 22 associated with the cam mechanism 15. Air is supplied to the cylinder 18 through an air inlet coupling 24, connected to the base of the pistol-shaped member 11, a three-way trigger-actuated valve 25, and a feeder tube 26.

Advantageously, the use of a pneumatically operated piston, rather than an electrically operated one, for example, provides a greater driving force for stripping insulation in a given compact area, is smoother operating, and involves a simpler and more reliable mechanism for effecting linear motion of the cam mechanism. The use of air-operated cutting heads is also much safer to the operator than are electrically heated counterparts. Such cutting heads further eliminate the possibility of any odor which normally arises in using electrically heated devices to burn or scar the insulation prior to the stripping operation.

Considering the cam-operated wire stripping mechanism 15 in greater detail, a stationary bed 19, which includes an integral U-shaped support member 23, is affixed to the base members 13, 14. Member 23 has the configuration of member 40 depicted in FIG. 3 and supports a pair of mutually opposed wire cutting slide fixtures 32, 33, best seen in FIGS. 2, 6 and 8. A pair of insulation cutting heads 34, 35 are mounted by suitable fastening elements 37 to the sides of slide fixtures 32 and 33, respectively. The cutting heads, as best seen in FIG. 4, each has a series of concave, semi-circular cutting edges of increasing radii from top to bottom, the corresponding cutting edges in the two heads being mutually opposed. As thus arranged, the cutting heads are adaptable to strip the insulation from wire of various diameters. Cutting fixtures 32, 33 are bilaterally movable in a direction toward and away from each other by means of slide pins 36. As best seen in FIGS. 5, 6 and 8, each of cutting fixtures 32, 33 is supported by a pair of pins 36 rigidly mounted at one common end in bores of the vertically extending portion of the U-shaped member 23 adjacent thereto. The other ends of each pair of pins extend into over-size bores of the particular cutting fixture 32, 33 associated therewith. The manner in which the cutting heads are actuated will be described in greater detail hereinbelow.

A second U-shaped support member 40, best seen in FIGS. 3, 6 and 8, is affixed to a slidable guide rod 42 mounted in a longitudinally extending bore of the stationary base 19. As depicted in FIGS. 1 and 3, the guide rod 42 is affixed to the U-shaped member 40 by means of a press-fit, a fastening element 43, or both. A resilient spring 45, attached at one end to a longitudinally extending portion of pistol-shaped member 11 and attached at the other end to the guide rod 42, spring biases the U-shaped member 40 outwardly by a sufficient amount to cause the jaws to open after reaching their furthest extremity. A more detailed discussion of the operation of the jaws, as well as of an alternative arrangement to replace the spring, will be given hereinbelow.

A pair of mutually opposed wire jaw fixtures 50, 51, best seen in FIGS. 2, 6 and 8, respectively support two mutually opposed serrated jaw members 52, 53 by means of suitable fastening elements 54. Each of jaw fixtures 50, 51 is supported by a pair of pins 55 rigidly mounted at one common end in bores of the vertically extending portion of the U-shaped member 40 adjacent thereto. The other ends of each pair of pins extend into over-size bores of the particular jaw fixture 50, 51 associated therewith.

A vertically extending guide member 56, best seen in FIGS. 2 and 3, is affixed to the stationary base 19 and includes a vertical series of apertures 57 which, as shown, progressively increase in diameter from top to bottom. Apertures 57 are in alignment with and matched to the various size apertures defined by the semi-circular cutting edges of heads 34, 35 when in their closed position. Guide member 56 thus allows an operator to quickly ascertain which aperture in the guide, as well as which pair of semi-circular cutting edges in the heads 34, 35, is most appropriate for stripping the insulation from a wire of a particular diameter.

A vertically extending and longitudinally adjustable stop member 58, best seen in FIG. 1, is also mounted on the stationary bed 19. Stop member 58 determines the length of wire that can be inserted into the device and thereby determines the length of insulation to be stripped from the wire in a readily adjustable and reliable manner.

In accordance with another aspect of the invention, the cutting heads 34, 35 are movable bilaterally and the wire jaws 52, 53 are sequentially movable orthogonally, i.e., bilaterally and longitudinally, in response to the same linear movement of the cam plate 22. Considered more specifically, cam plate 22 has a first pair of guide slots 60, best seen in FIGS. 2, 6 and 8, associated with the cutting fixtures 32, 33, and a second, shorter pair of slots 62, associated with the jaw fixtures 50, 51. Each of cutting fixtures 32, 33 has affixed to the underside thereof a guide pin 65, best seen in FIG. 5, which engages the particular one of the slots 60 adjacent thereto. Each of jaw fixtures 50, 51 has a similar pin 66 engaging the particular slot 62 adjacent thereto.

As best seen in FIGS. 6 and 8, slots 60 are symmetrically disposed in cam plate 22 and shaped as mirror images, i.e., they have identical, parallel extending sections merging into identical, short diverging sections in the direction toward the wire inserting end of the device. Slots 62 are also disposed in cam plate 22 but are much shorter than slots 60. They first diverge outwardly, and then extend in parallel relation toward the wire inserting end of the device.

With the guide pins 65 associated with cutting fixtures 32, 33 positioned at the most divergent corresponding ends of slot 60, it is seen that the cutting heads will be in their open position. Similarly, with pins 66 associated with jaw fixtures 50, 51 positioned at the most divergent corresponding ends of slot 62, jaw members 52, 53 will be in their open position.

As the slidable cam plate 22 is driven outwardly, i.e., from left to right in FIGS. 6 and 8, by piston 20, to the position depicted in FIG. 6, the pins 65, associated with slots 60, are located between the diverging and parallel sections of the slots. This resultant converging movement of the pins 65 causes the cutting fixtures 32, 33 to move the cutting heads 34, 35 toward each other to the point where they will form a circular cutting aperture to sever the insulation of a wire 59 disposed therebetween.

This same position of the cam plate 22 results in pins 66, associated with the jaw fixtures 50, 51, being located at the ends of slots 62 in closest proximity to each other. This location of pins 66 in turn positions the serrated surfaces of jaws 52, 53 in closest proximity to each other. The jaws 52, 53 are spring biased inwardly toward each other so as to accommodate and adequately grip various wire insulation diameters without impairing the insulation. This is accomplished by positioning a spring-biased plunger assembly 61, as depicted in FIGS 1, 3 and 8A, within a bore of and attached at one end to each of the vertically extending portions of the U-shaped member 40.

FIG. 7 depicts the position of the cutting heads 34, 35 and the serrated jaws 52, 53 relative to the wire 59 interposed therebetween prior to the stripping of the insulation 62 therefrom.

FIGS. 8A and 8B depict the position of the wire jaw assembly including jaws 52, 53 relative to the cutting head assembly including heads 34, 35 when the cam plate 22 is moved outwardly further by piston 20 from the position depicted in FIG. 6. As is readily apparent in FIG. 8A, both the cutting heads 34, 35 and jaws 52, 53 remain in their closed position, i.e., in closest proximity to each other, until movement of the cam plate 22 stops, the limit of traversal being when the piston 20 is fully extended. As the cutting heads remain closed during this period, they strip the severed insulation from the wire which is pulled away from the cutting heads by the outward movement of the jaws. This stripping action is best illustrated in FIG. 9.

At the point of furthest traversal of the jaw assembly, and upon release of the trigger 17, the spring-loaded air cylinder 18 pulls the cam plate 22 and the jaw assembly back to their original positions. Immediately after the trigger is released, the spring 45 tends to resist the backward longitudinal movement of the jaw assembly relative to the movement of the cam plate 22. The biasing force of the spring is sufficient to cause the pins 66 in slots 62 to move outwardly from the position depicted in FIG. 8A to the position depicted in FIG. 8B. Hence, the spring 45 results in the jaws 52, 53 opening before they move any appreciable longitudinal distance toward the cutting head assembly in response to the backward movement of the cam plate. This insures that the wire previously pulled out of the device will not be pulled back into the device by a distance equal to the longitudinal length of slots 62 which would otherwise be the case if jaw opening was made dependent solely on movement of the cam plate.

When the jaw assembly is adjacent to the cutting head assembly again, as depicted in FIG. 6, further backward movement, i.e., from right to left of the cam plate 22, caused by the spring-returned cylinder rod 20, forces the pins 65 in slots 60 to diverge. This opens the cutting heads 34, 35 in preparation for a subsequent stripping operation just before the cylinder rod 20 is fully retracted.

In accordance with another aspect of the invention, upon release of the trigger 17, the cylinder 18 exhausts, discharging the air through the three-way valve 25 and exhaust tube 27, best seen in FIGS. 1 and 2, to the region of the cutting heads. As a result, the severed insulation is blown clear of the device after each stripping operation.

FIG. 10 depicts an alternative arrangement for biasing the guide rod 42. In place of the spring 45, a collar 70 is positioned partially coaxially of the rod 42 and affixed to the bottom side of the stationary base member 19. A nylon bushing 71, preferably having a concave surface to match the guide rod 42, is biased thereagainst by an adjustable biasing screw 72 threaded into a bore in the collar 70. In operation, the friction of the nylon bushing 71 is adjusted to force the guide pins 66 to diverge along slots 62 and open the jaws prior to any appreciable longitudinal movement of the jaws in response to the backward movement of the cam plate.

In view of the foregoing description, the following operating sequences are seen to occur after the air control trigger 17 is actuated: the cam plate 22 advances in response to the pneumatically driven piston 20; the cutting heads 34, 35 close because of the converging movement of pins 65 in slots 60, thereby severing the insulation to the depth of the wire inserted therebetween; and simultaneously the jaws 52, 53 initially close because of the converging movement of pins 66 in slots 62 so as to grasp the wire, and subsequently move outwardly with the cam plate 22 so as to pull the wire away from the cutting heads. As the wire recedes, the cutting heads remain closed, retaining the severed portion of insulation, thus stripping the wire to the predetermined length. When the trigger is released, the cam plate 22 is spring returned by means of the cylinder rod 20 to its original position. Immediately after the start of the piston's return travel, the jaws are opened as a result of the spring-biased or friction-biased guide rod 42. The cutting heads are not opened until the piston is almost completely retracted. In conjunction with the release of the trigger, the air cylinder exhausts in the cutting head area to blow the severed insulation away from the device.

It is to be understood that the specific embodiment described herein is merely illustrative of the general principles of the present invention. Various other arrangements and modifications may be devised in the light of this disclosure by one skilled in the art without departing from the spirit and scope of this invention.

What is claimed is :

1. Apparatus for stripping insulation from wire and the like comprising:
   a stationary base including a pistol-shaped hand-grip member,
   movable cam means mounted on said base,
   first means mounted on said base and responsive to the movement of said cam means for circumferentially severing the insulation from a wire inserted in said apparatus,
   second means mounted on said base and responsive to the movement of said cam means for pulling said wire from the severed insulation, and
   actuating means mounted on said base and including an air cylinder for driving a pneumatically controlled spring-returned piston, said piston being connected to and effecting movement of said cam means initially in a first direction and subsequently in a second opposite direction.

2. Apparatus in accordance with claim 1 further comprising guide means including a series of vertically disposed apertures of varying diameter adaptable to accommodate wire of different diameters inserted therein and to align said wire with the most appropriate matched cutting edges of said cutting heads.

3. Apparatus for stripping insulation from wire and the like comprising:
   a stationary base including a pistol-shaped hand-grip member,
   movable cam means mounted on said base,
   a first means movable bidirectionally in response to the movement of said cam means for circumferentially cutting the insulation from a wire inserted therein,
   second means sequentially movable orthogonally in response to the movement of said cam means for grasping said wire and then pulling it away from said first means and the severed insulation,
   guide means mounted on said base and including a series of apertures of varying diameter disposed vertically with respect to said cam means for aligning a wire inserted therein according to diameter with the most appropriate area of said first means conducive to cutting the insulation, and
   adjustable wire stopping means mounted on said base and positioned on the side of said first means opposite said second means for determining the length of insulation to be stripped from a wire inserted in the apparatus.

4. Apparatus according to claim 3 wherein said first means comprises a pair of cutting heads, each including a series of corresponding semi-circular cutting edges aligned with the apertures in said guide means, respectively, each matching pair of cutting edges being respectively adaptable to cut the insulation of a wire of different diameter, and wherein said second means comprises a pair of mutually opposed jaws movable initially toward each other to grasp said wire and subsequently movable in a direction perpendicular to said first direction for pulling the wire from said first means and from the severed insulation.

5. Apparatus in accordance with claim 3 wherein said cam means comprises a slidable plate including keying means to actuate movement of said first and second means selectively.

6. Apparatus in accordance with claim 5 wherein said actuating means includes an air cylinder driving a pneumatically controlled, spring-returned piston connected to said cam plate and further including restoring means for moving said cam plate back to its original position after the insulation has been severed and removed from a wire inserted in the apparatus.

7. Apparatus in accordance with claim 6 further including a spring-biased trigger, a three-way valve actuated by said trigger and an exhaust tube connected to said valve and terminating in the area of said cutting heads, said trigger upon being released exhausting air through said valve and said tube to blow the severed insulation from the apparatus.

8. Apparatus for stripping insulation from wire and the like comprising:
a stationary base including a pistol-shaped hand-grip member,
movable cam means mounted on said base,
first means including a pair of cutting heads movable bidirectionally toward and away from each other in response to the movement of said cam means for circumferentially cutting the insulation from a wire inserted therebetween, said cutting heads each having a series of vertically disposed semi-circular cutting edges respectively adaptable to cut the insulation of wire of different diameters,
second means including a pair of clamping jaws sequentially movable orthogonally in response to the movement of said cam means for initially grasping said insulated wire and subsequently pulling said wire from said cutting heads and from the severed insulation,
actuating means including an air cylinder driving a pneumatically controlled, spring-returned piston for moving said cam means in a first direction and then in a second direction opposite to said first direction after the insulation has been stripped from said wire.

9. Apparatus in accordance with claim 8 further including means for retarding movement of said clamping jaws in said second direction until they have opened to release the wire inserted therebetween.

10. Apparatus in accordance with claim 8 further including means for spring biasing said jaws toward each other to accommodate wire having insulation of various diameters.

11. Apparatus in accordance with claim 8 further comprising stationary guide means mounted on said base and positioned adjacent said jaws, said guide means including a series of apertures of varying diameter respectively aligned according to size with the cutting edges of said cutting heads, and further comprising adjustable wire stopping means mounted on said base and positioned on the side of said cutting heads opposite said jaws for determining the length of insulation to be stripped from a wire inserted in said apparatus.

12. Apparatus in accordance with claim 11 wherein said movable cam means comprises a cam plate including first and second pairs of slots, wherein said first means further includes a guide pin associated with each of said cutting heads respectively engaging the slots of said first pair of slots, and wherein said second means further includes a guide pin associated with each of said jaws respectively engaging the slots of said second pair of slots, said first and second pairs of slots each including matching diverging sections to cause bidirectional movement of said first and second means, respectively, said second pair of slots being shorter than said first pair of slots so that the engaging pins associated with said second pair of slots in reaching one common end thereof carry the jaws with and in the direction of movement of said cam plate.

13. A tool for stripping insulation from the end of a wire comprising:
a stationary base,
means affixed to said base for locating the wire according to size,
means including a pair of cutting heads mounted on and movable with respect to said base for severing the insulation from said wire, said cutting heads each having a series of mutually opposed semi-circular cutting edges,
means including a pair of jaws mounted on and orthogonally movable with respect to said base for initially gripping and subsequently pulling the wire from the severed insulation,
means for actuating the gripping means and the severing means in sequence, and
means including a pneumatically driven piston connected to said actuating means for applying reciprocating forces thereto.

14. Apparatus for stripping insulation from wire and the like comprising:
a stationary base,
movable cam means mounted on said base,
first means including a pair of cutting heads each movable bidirectionally toward and away from each other in response to the movement of said cam means for circumferentially severing the insulation from a wire inserted therebetween,
second means including a pair of jaws keyed to said cam means and sequentially movable orthogonally with respect to said base in response to the movement of said cam means for initially gripping and subsequently pulling said wire away from said first means and the severed insulation, and
power driven actuating means mounted on said base and connected to said cam means for moving said cam means reciprocally on said base.

15. Apparatus in accordance with claim 14 wherein said movable cam means comprises a cam plate including first and second pairs of key slots, and wherein said means including said pair of cutting heads further includes a guidepin associated with each of said cutting heads and respectively engaging one of the slots of said first pair of slots, and wherein said second means including said pair of jaws further includes a guide pin associated with each of said jaws and respectively engaging one of the slots of said second pair of slots, said first and second pairs of slots selectively defining the direction of sequential movement of said cutting heads and jaws, respectively.

16. A tool according to claim 13 wherein said actuating means comprises a slidable cam plate separately keyed to each of said gripping and severing means, said cam plate closing said gripping and severing means immediately after being moved a short distance in a first direction and maintaining said gripping means continuously in an open position and opening said severing means near completion of movement of said cam plate in a second opposite direction.

17. A tool according to claim 16 further including means for retarding movement of said gripping means in response to said cam plate in said second direction until said gripping means have opened to release a wire inserted therebetween, and further including means for spring biasing said gripping means toward each other so as to accommodate wire having insulation of various diameters without impairing the insulation surface.

18. A tool according to claim 17 wherein said retarding means comprises a slidable guide rod mounted in a longitudinally extending bore of said stationary base, said guide rod being affixed at one end to said gripping means and spring biased outwardly at the other end from a terminating portion of said base.

19. A tool according to claim 18 wherein said retarding means comprises a slidable guide rod mounted in a longitudinally extending bore of said stationary base, said guide rod being affixed at one end to said gripping means and having an adjustable bushing frictionally bearing against an intermediate region thereof.

References Cited in the file of this patent

UNITED STATES PATENTS

| | | |
|---|---|---|
| 1,733,294 | Cross | Oct. 29, 1929 |
| 2,338,508 | Hackbarth | Jan. 4, 1944 |
| 2,422,776 | Cunny et al. | June 24, 1947 |
| 2,601,797 | Holt | July 1, 1952 |
| 2,724,985 | Chamberlin | Nov. 29, 1955 |
| 2,735,320 | Green | Feb. 21, 1956 |
| 2,886,995 | Bach et al. | May 19, 1959 |
| 2,940,343 | Hindenburg | June 14, 1960 |
| 3,002,408 | Schwalm et al. | Oct. 3, 1961 |
| 3,069,943 | Fischer | Dec. 25, 1962 |
| 3,089,367 | Schluter | May 14, 1963 |

FOREIGN PATENTS

| | | |
|---|---|---|
| 609,834 | Great Britain | Oct. 7, 1948 |